(12) United States Patent
Singh et al.

(10) Patent No.: US 8,366,426 B2
(45) Date of Patent: Feb. 5, 2013

(54) COMBINATION LOADER AND POST CURE INFLATOR

(75) Inventors: Anand Pal Singh, Akron, OH (US); Daniel Zaklanovich, Tallmadge, OH (US); William Forte Franchim, Stow, OH (US)

(73) Assignee: McNeil & NRM, Inc., Akron, OH (US)

( * ) Notice: Subject to any disclaimer, the term of this patent is extended or adjusted under 35 U.S.C. 154(b) by 296 days.

(21) Appl. No.: 12/909,454

(22) Filed: Oct. 21, 2010

(65) Prior Publication Data

US 2011/0088812 A1 Apr. 21, 2011

Related U.S. Application Data

(60) Provisional application No. 61/253,631, filed on Oct. 21, 2009.

(51) Int. Cl.
*B29C 35/16* (2006.01)
(52) U.S. Cl. .......................................... 425/38; 425/58.1
(58) Field of Classification Search .................. 425/38, 425/58.1
See application file for complete search history.

(56) References Cited

U.S. PATENT DOCUMENTS

| | | | |
|---|---|---|---|
| 3,075,237 A | 1/1963 | Soderquist | |
| 4,092,090 A | 5/1978 | Yuhas et al. | |
| 4,124,337 A | 11/1978 | Martin | |
| 4,169,698 A | 10/1979 | Turk et al. | |
| 4,170,442 A | 10/1979 | Singh | |
| 4,702,669 A * | 10/1987 | Ichikawa et al. | 425/58.1 |
| 4,768,937 A | 9/1988 | Singh | |
| 4,921,412 A | 5/1990 | Scantland et al. | |
| 5,352,104 A | 10/1994 | Ichikawa et al. | |
| 5,681,594 A * | 10/1997 | Irie | 425/58.1 |
| 5,770,236 A | 6/1998 | Ureshino et al. | |
| 6,214,280 B1 | 4/2001 | Delmoro | |
| 6,241,501 B1 * | 6/2001 | Mitamura | 425/58.1 |
| 6,620,367 B1 | 9/2003 | Mitamura | |
| 7,311,872 B2 | 12/2007 | Mitamura et al. | |
| 7,628,599 B2 | 12/2009 | Girard et al. | |
| 7,744,359 B2 * | 6/2010 | Himeno et al. | 425/58.1 |

OTHER PUBLICATIONS

Search Report for PCT/US2010/053555 dated Jul. 1, 2011.

* cited by examiner

*Primary Examiner* — James Mackey
(74) *Attorney, Agent, or Firm* — Pearne & Gordon LLP

(57) ABSTRACT

A combination loader and post cure tire inflator for use with a tire press is provided. A post cure inflator for inflating and curing vulcanized tires includes a plurality of inflator stations with each inflator station including a pair of axially aligned, vertically separable tire inflating chuck rings. A loading apparatus includes a loading arm movable along a linear track relative to the plurality of inflator stations to load and unload each vulcanized tire in a selected one of the plurality of inflator stations without rotating the vulcanized tires in a turnover operation.

20 Claims, 12 Drawing Sheets

COMBINATION LOADER AND POST CURE INFLATOR

CROSS-REFERENCE TO RELATED APPLICATIONS

This application claims the benefit of U.S. Provisional Application No. 61/253,631, filed Oct. 21, 2009, the entire disclosure of which is hereby incorporated herein by reference.

FIELD OF THE INVENTION

The present invention relates generally to tire manufacturing, and more particularly, to a combination loader and post cure inflator.

BACKGROUND OF THE INVENTION

Present day tire curing is accomplished by a tire curing press which shapes and cures the green or uncured tire carcass and then discharges the cured tire usually on an inclined conveyor at the rear of the press. If post cure inflation is employed, it is generally accomplished by a separate machine positioned at the rear of the press. For example, a post cure inflator (hereinafter "P.C.I.") can be used that allows the tire to cool in an inflated condition (e.g., 100 psi or other pressure), so as to prevent damage to the tire, such as flat spots or the like. In order to be positioned properly in the post cure inflator, the tire must be restrained or recaught after discharge from the press and properly centered for engagement with the bead engaging rims when the post cure inflator closes. Such restraint and centering devices which engage the outside or tread of the tire are complex and costly, requiring adjustment for different tire sizes. When tires are dropped onto a conveyor, particularly as the result of a stripping or ejecting mechanism imparting a force to the tire, the position the tire may obtain after striking the conveyor can vary widely due to the momentum achieved by the drop or by acceleration down an inclined conveyor, and the inherent resiliency or tendency to bounce in the tire itself. A common complaint about post cure inflators is that the tire restraint or centering devices fail to perform properly. Tires have been known to pass completely through a post cure inflator. Obviously, if the tire is not properly centered, a defective tire will result. Moreover, since the post cure inflator is usually interlocked with the tire curing press, a malfunction in the post curing operation may cause the press to stop. Various examples can be seen in U.S. Pat. Nos. 4,169,698; 4,124,337; 4,092,090; and 3,075,237 which are incorporated herein by reference.

Additionally, various types of unloading devices for tire presses have been in use or known for a number of years. However, in curing presses which employ an upstanding bladder mechanism, removal of the tire is particularly difficult because of the presence of the bladder mechanism. Moreover, removal of the tire is further complicated by the post cure inflation of the tire after curing in that the tire must be properly presented to the post cure inflator to insure automatic operation. In addition, the cured tire should be removed vertically from the bladder mechanism to minimize chances of a bead being caught by the top of the shaping bladder and being punched or kinked. One example can be seen in U.S. Pat. No. 4,170,442 which is incorporated herein by reference.

Current technology for post curing devices is generally in the form of 2-position, turnover and elevator type machines. Example disadvantages of these types of devices include, but are not limited to: Large space consuming frames; Costly motors and gear boxes requiring multiple service lines and connections, which cause high plant cost; Un-friendly to maintenance workers and operators, such as requiring access platforms, ladders and lifts required for operator ring change, restricted access to maintenance workers, and/or time consuming troubleshooting and maintenance schedules; Angle discharge of tires resulting in upended and misplaced tire positions; Multiple loading and unloading devices required for tire manipulation; Ring adjustment requires complex and costly machined parts; Accuracy of tire placement and loading of rings not consistent during post cure cycle; and Press to P.C.I. interface requires lengthy setup times with multiple device placement and high accuracy.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present invention, a combination loader and post cure tire inflator for use with a tire press is provided. A post cure inflator for inflating and curing vulcanized tires includes a plurality of inflator stations with each inflator station including a pair of axially aligned, vertically separable tire inflating chuck rings. A loading apparatus includes a loading arm movable along a linear track relative to the plurality of inflator stations to load and unload each vulcanized tire in a selected one of the plurality of inflator stations without rotating the vulcanized tires in a turnover operation.

In accordance with another aspect of the present invention, a combination loader and post cure tire inflator for use with a tire press is provided. A post cure inflator for inflating and curing vulcanized tires includes a plurality of inflator stations with each inflator station includes an upper chuck ring axially aligned with and vertically separable from a lower chuck ring. Each pair of upper and lower chuck rings is coupled to a frame with one of the upper and lower chuck rings being maintained at a fixed location on the frame while the other of the upper and lower chuck rings is vertically movable along the frame. A loading apparatus includes a loading arm movable along a linear track relative to the plurality of inflator stations to load each vulcanized tire in a selected one of the plurality of inflator stations, and to unload said vulcanized tire therefrom for placement on a tire discharge station located downstream of the plurality of inflator stations.

In accordance with another aspect of the present invention, combination loader and post cure tire inflator for use with a tire press is provided. A post cure inflator for inflating and curing vulcanized tires includes a plurality of inflator stations with each inflator station comprising a pair of axially aligned, vertically separable tire inflating chuck rings. A loading apparatus includes a loading arm movable relative to the plurality of inflator stations to load and unload each vulcanized tire in a selected one of the plurality of inflator stations. A tire discharge station is located downstream of the post cure inflator. A workflow pathway extends through the post cure inflator and towards the tire discharge station. The loading apparatus is arranged to permit the loading arm to retrieve each vulcanized tire from a tire curing press located upstream of the post cure inflator and move said vulcanized tire along the workflow pathway.

It is to be understood that both the foregoing general description and the following detailed description present example and explanatory embodiments of the invention, and are intended to provide an overview or framework for understanding the nature and character of the invention as it is claimed. The accompanying drawings are included to provide a further understanding of the invention and are incorporated into and constitute a part of this specification. The drawings illustrate various example embodiments of the invention, and together with the description, serve to explain the principles and operations of the invention.

BRIEF DESCRIPTION OF THE DRAWINGS

The foregoing and other aspects of the present invention will become apparent to those skilled in the art to which the present invention relates upon reading the following description with reference to the accompanying drawings, in which.

DESCRIPTION OF EXAMPLE EMBODIMENTS

Figure 1:
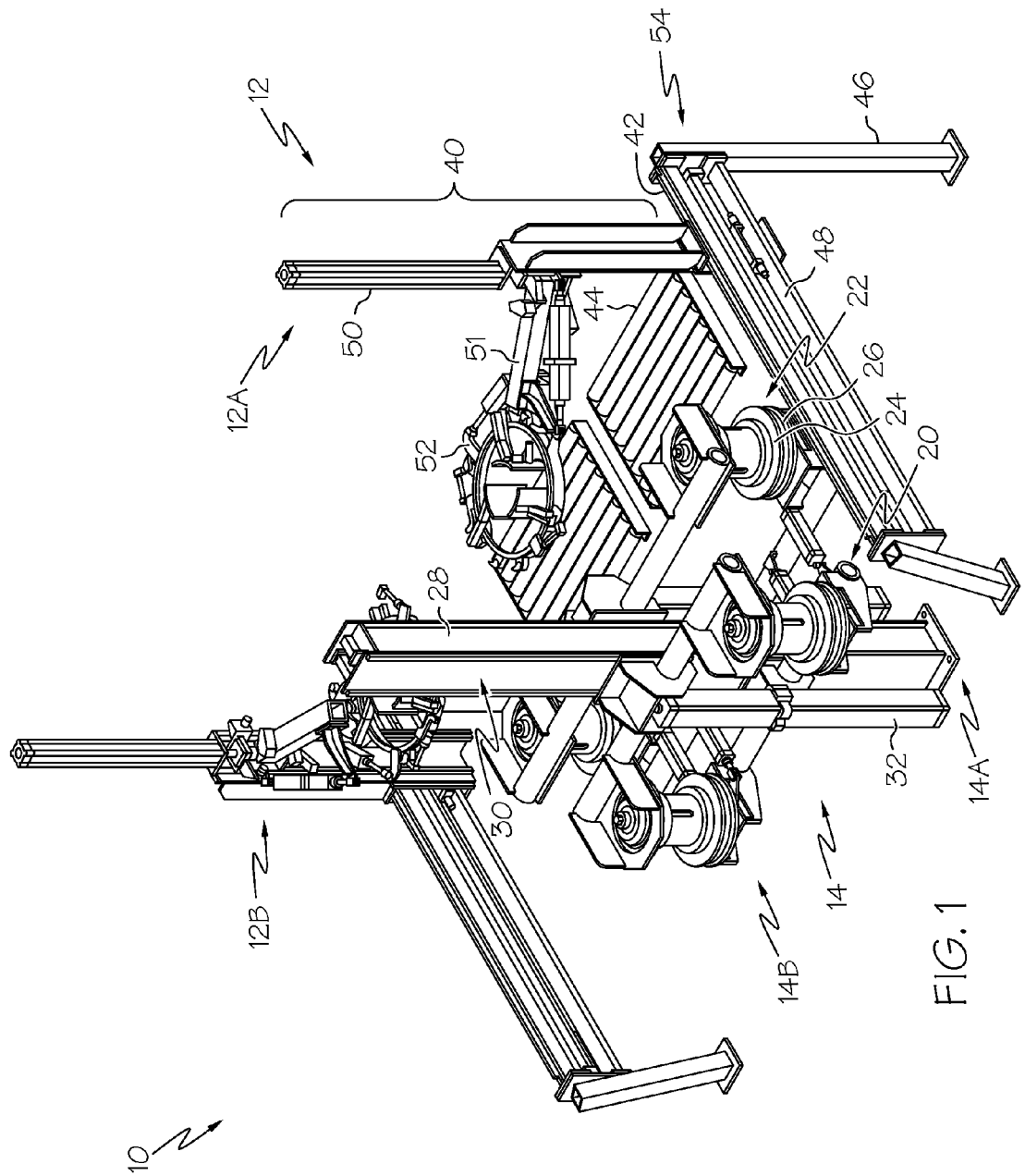
FIG. 1 is a perspective view of an example combination loader and post cure inflator.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Turning to the drawings, FIG. 1 illustrates a perspective view of an example combination loader and post cure inflator 10. The combination loader and post cure inflator 10 includes a novel loading apparatus 12 and a novel post cure inflator 14 provided to operate as a single machine. It is understood that the loading apparatus 12 and post cure inflator 14 can be physically integrated or distinct, though are arranged to operate together as a single machine.

Figure 2:
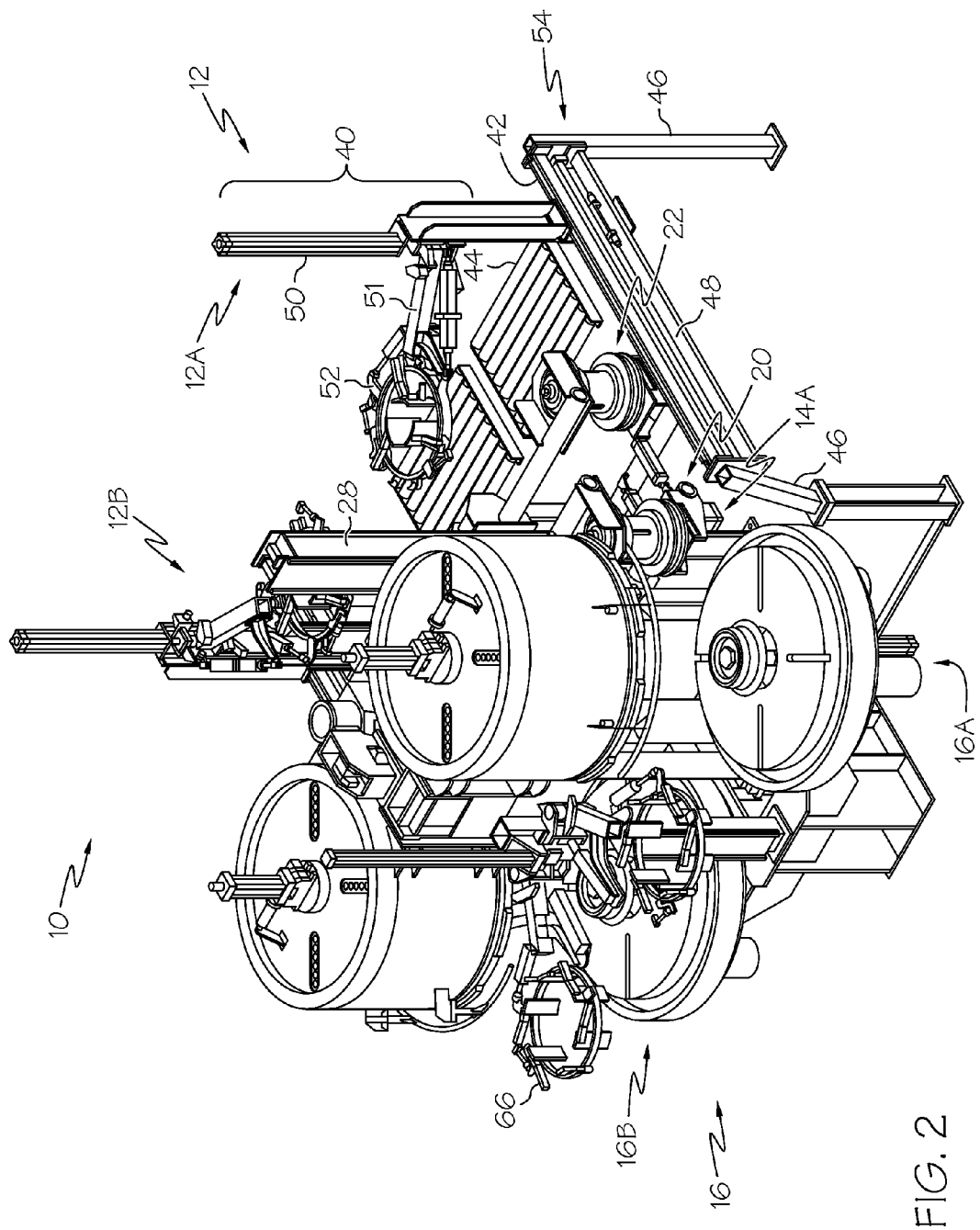
FIG. 2 is similar to FIG. 1, but also shows an example tire press.

As shown in FIG. 2, the combination loader and post cure inflator 10 is located downstream from a tire curing press 16. Generally, post cure inflators are designed to be positioned at the rear of a dual cavity tire curing press 16 for inflating and curing vulcanized tires. Accordingly, the post cure inflator 14 can have four pairs of inflating rims, two pairs on each side of the frame, with opposed pairs receiving tires from one cavity of the tire curing press 16 to post cure the tire while inflated during substantially two cycles of the press. However, it is understood that each loading apparatus 12 and post cure inflator 14 can correspond generally to one cavity of the tire curing press 16. Thus, as shown in FIG. 2, the combination loader and post cure inflator 10 includes a pair of loading apparatuses 12A, 12B and a pair of associated post cure inflators 14A, 14B to correspond to the pair tire curing press cavities 16A, 16B. It is also understood that various numbers of tire curing press cavities, loaders and/or post cure inflators can be provided as desired. Moreover, while only a single loading apparatus 12 and post cure inflator 14 are described in detail herein, such description applies similarly to all such loading apparatuses 12A, 12B and associated post cure inflators 14A, 14B.

The shown example post cure inflator 14 is a four position P.C.I. assembly including two inflator stations 20, 22 per tire curing press cavity 16A, 16B though it can also include various numbers of stations. Also as shown, the two stations 20, 22 are arranged in a staggered formation such that two vulcanized tires can be post cured simultaneously (i.e., one tire each on station 20, 22) while occupying relatively less lateral floorspace. Thus, for example, one cured tire can be inflating in an already occupied station 20 as another laterally offset station 22 is independently loaded or unloaded by the loading apparatus 12.

Each inflator station 20, 22 includes a pair of axially aligned, vertically separable tire inflating chuck rings. The tire inflating chuck rings can be generally conventional, including any or all of alignment structure, locking structure, inflating structure, etc. usable with a single size or multiple sizes of tires. For example, each inflator station 20, 22 includes an upper chuck ring 24 axially aligned with and vertically separable from a lower chuck ring 26. Each pair of upper and lower chuck rings 24, 26 is coupled to a frame 28 with one of the upper and lower chuck rings 24, 26 being maintained at a fixed location on the frame 28 while the other of the upper and lower chuck rings 24, 26 is vertically movable along the frame 28. In one example, the upper chuck ring 24 can be mounted to a beam or the like located about a central column 30 of the frame 28 with controlled vertical raise/lower by a powered mechanism 32, such as by an pneumatic cylinder, electric motor, hydraulic cylinder, etc. The lower chuck ring 26 can be permanently fixed to the same central column 30. Further, one inflator station 20 can be located on one side of the central column 30 and be driven by one powered mechanism 32, while the other inflator station 22 can be located on another side of the column and be independently driven by another powered mechanism (not shown). Thus, the upper and lower chuck rings 24, 26 can be vertically separable without rotating the vulcanized tires in a turnover operation as is conventional. It is also contemplated that the upper chuck ring 24 can be fixed while the lower chuck ring 26 is movable, or that both of the upper and lower chuck rings 24, 26 can be movable. It can be beneficial to position either or both of the chuck rings 24, 26 towards a lower level of the assembly to provide easy access for exchange (e.g., for different tire sizes), repair, replacement, and/or maintenance of the chuck rings 24, 26.

Each inflator station 20, 22 can be independently operated, though two or more stations can be operated together (i.e., one station for each tire curing press cavity). In one example, the tires can be cooled on the inflator stations 20, 22 for about twice as long as the tire press cavity cycle. Thus, the post cure inflator 14 can have two stations per press cavity such that two vulcanized tires can be continuously cured at once in an alternating configuration.

Figure 3:
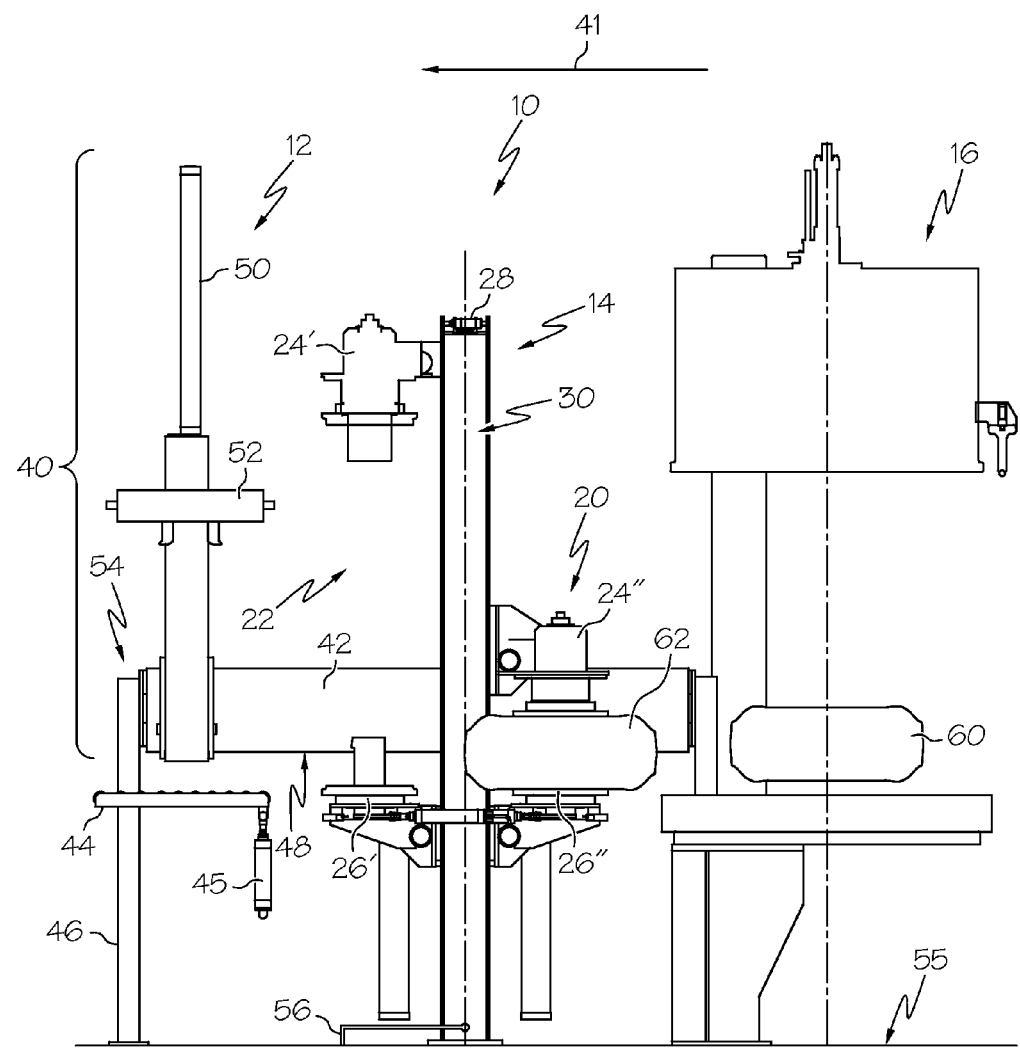
FIGS. 3-12 illustrate schematic views of an example operation cycle of the combination loader and post cure inflator of FIG. 1.

The combination loader and post cure inflator 10 further includes a loading apparatus 12 that includes a loading arm 40 movable along a linear track 42 relative to the plurality of inflator stations 20, 22 to load and unload each vulcanized tire in a selected one of the plurality of inflator stations 20, 22 without rotating the vulcanized tires in a conventional turnover operation. A workflow pathway 41 (see FIG. 3) extends through the post cure inflator 14 and towards a tire discharge station 44 located downstream of the inflator stations 20, 22. The loading apparatus 12 is arranged to permit the loading arm 40 to retrieve each vulcanized tire from a cavity 16A, 16B of the tire curing press 16 located upstream of the post cure inflator stations 20, 22 and move said vulcanized tire (e.g., tire 60 of FIG. 3) along the workflow pathway 41. The linear track 42 is arranged to permit the loading arm 40 to move said vulcanized tire to any position along the workflow pathway 41. For example, the linear track 42 can be arranged to one side of the plurality of inflator stations 20, 22 such that the loading arm 40 can individually access each of the inflator stations 20, 22 to load and/or unload vulcanized tires. The loading arm 40 can also be positioned to access at least one cavity of the tire curing press 16 so as to be able to move a tire therefrom and into one of the inflator stations 20, 22. The loading arm 40 can further be positioned to access the tire discharge station 44 so as to be able to move a tire from the inflator stations 20, 22 and onto the tire discharge station 44. It is also contemplated that loading arm 40 can be positioned to move a vulcanized tire directly to the tire discharge station 44 directly from the tire curing press 16 without loading said vulcanized tire in one of the plurality of inflator stations 20, 22 (e.g., a bypass operation) where no post cure inflation step is used.

The loading arm 40 can be movable about the linear track 42 in various manners. In one example, the motion of the loading arm along the linear track includes a horizontal component. For example, the loading arm 40 can be horizontally movable along the linear track 42 to translate along a generally straight, horizontal path along the linear track 42 to access any or all of the tire curing press 16, inflator stations 20, 22, and tire discharge station 44. In other examples, the linear track 42 can be arranged along a curved path or at an angle such that the loading arm 40 can move along the curved path or at an angle with a horizontal motion component relative to any or all of the tire curing press 16, inflator stations 20, 22, and tire discharge station 44. A curved path or angled linear track 42 can include motion components along various axes, and can be useful where various stations are arranged horizontally and/or vertically displaced from each other.

The loading arm 40 can be driven along the linear track 42 using various powered mechanisms, such as an electric motor, pneumatic cylinder, hydraulic cylinder, etc., and can be directly or in-directly driven. In one example, the loading arm 40 can be driven using pneumatic power, such as with a rodless cylinder or the like. In other examples, the loading arm 40 can be driven using a rack-and-pinion gear arrangement or a chain-and-sprocket gear arrangement. Regardless of the type of powered mechanism, the loading arm 40 can be guided by, and/or supported by, a frame 46 that can be coupled to or independent from the post cure inflator 14 and/or tire curing press 16. In addition or alternatively, the frame 46 can include an auxiliary support 48 that can generally follow the linear track 42 to provide additional guidance and/or support for the loading arm 40. For example, the auxiliary support 48 can be generally parallel to the linear track 42 and can be configured to provide mechanical support along one or more axis of the loading arm 40 to relieve stress on the loading arm 40 and/or powered mechanism, such as when the loading arm 40 is supporting a tire. The loading arm 40 and/or auxiliary support 48 can include friction-reducing structure, such as bearings, bushings, Teflon pads, etc.

In addition or alternatively, the loading arm 40 can further include a motion component along an axis generally transverse to the linear track 42 for loading and unloading the vulcanized tires in the plurality of inflator stations 20, 22. In one example, the loading arm 40 can include includes a vertical motion component movable relative to the linear track 42. For example, the loading arm 40 can be vertically movable along a single axis, or along multiple axes that include at least a vertical motion component, for picking up and/or placing the vulcanized tires in any or all of the tire curing press 16, inflator stations 20, 22, and tire discharge station 44. In one example, at least a portion 51 of the loading arm 40 can be vertically movable for vertically lifting a tire from an immovable lower chuck ring 26. The vertical movement of the loading arm 40 can be provided by various powered mechanisms 50, such as an electric motor, pneumatic cylinder, hydraulic cylinder, etc. In another example, the loading arm 40 can be laterally movable towards and away from the linear track 42. That is, the loading arm 40 can be laterally movable along an axis that is generally transverse to both of the horizontal and vertical axes described above. The loading arm 40 can be laterally movable in a linear direction, or a curved direction. For example, at least a portion 51 of the loading arm 40 can provide a pivoting, lateral swing motion relative to the linear track 42. The lateral motion of the loading arm 40 can provide greater reach, allowing the loading arm 40 an increased range of motion to retrieve and place the vulcanized tires in the tire curing press 16, post cure inflators 14, and the tire discharge station 44. The lateral motion of the loading arm 40 can further accommodate the staggered arrangement of the post cure inflator stations 20, 22.

The loading arm 40 can include various structure for capturing a vulcanized tire for movement among the various stations. For example, the loading arm 40 can include an inside-grab mechanism 52 adapted to engage an inner bead of the vulcanized tire. In one example, the inside-grab mechanism 52 can be disposed on the movable portion 51 of the loading arm 40. An inside-grab mechanism can be beneficial as it can facilitate alignment of the tire on the lower chuck ring 24 of the inflator station 20, 22. The inside-grab mechanism 52 can utilize various powered mechanisms, such as an electric motor, pneumatic cylinder, hydraulic cylinder, etc. Still, the loading arm 40 can also be used with an outside-grab mechanism adapted to grab a tire from its exterior perimeter.

The loading apparatus 12 can use various operational schemes. In one example, the loading arm 40 can have a home position at a location along the linear track 42, and the loading arm 40 can return to the home position when not performing a loading or unloading operation. For example, the home position can be located towards one end 54 of the linear track 42, and the loading arm 40 can move to the one end 54 of the linear track 42 when not performing a loading or unloading operation. When the loading arm 40 is located at the home position, it can remain generally out of the way of moving elements of the other operational stations (e.g., the post cure inflator 14, tire curing press 16, and/or tire discharge station 44) so as to not interfere. Additionally, the home position can provide a consistent location for starting or ending movement of the loading arm 40 to simplify and/or make more robust the digital or analog control system, such as a PLC system or other automation system. It is contemplated the loading apparatus 12 can also use an operational scheme without a home position, such as an operational scheme based on relative or incremental movement of the loading arm 40. For example, the control system can utilize various open-loop and/or closed-loop control schemes with various sensors, such as position sensors, proximity sensors, touch sensors, limit switches, etc. Movement of the loading arm 40 along the linear track 42 can be sensed at specific locations and/or continuously using different types of sensors, such as a proximity sensor, limit switch, and/or an LVDT displacement transducer, etc. In one example, the position of the loading arm 40 relative to the inflator stations 20, 22 for loading and unloading the tires can be sensed by detecting an absolute position of the loading arm 40 using an LVDT sensor or the like, and/or can also be detected by a limit switch or proximity sensor located next to each inflator station 20, 22. Various other operational schemes are also contemplated.

Additionally, the home position of the loading arm 40 can further include a vertical position thereof relative to the linear track 42. For example, when the loading arm 40 is located at the home position (e.g., at the one end 54 of the linear track 42), the loading arm 40 can be positioned at a relatively high vertical position so as to not interfere with the post cure inflator 14, tire curing press 16, and/or tire discharge station 44. It is contemplated that various other home positions can also be utilized.

Figure 11:
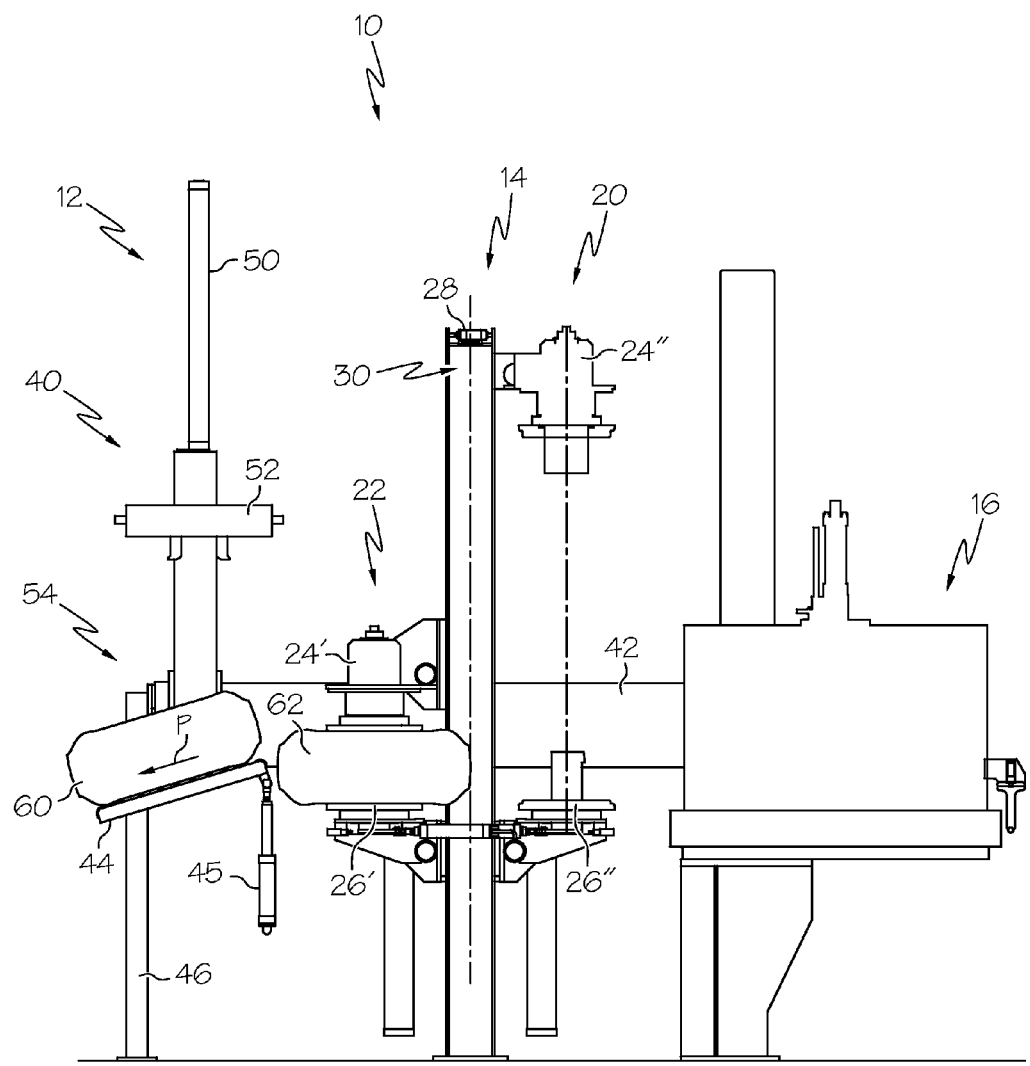

The tire discharge station 44 is located downstream of the post cure inflator stations 20, 22. The tire discharge station 44 can include various powered or un-powered structure. In one example, the tire discharge station 44 can include un-powered structure, such as table, roller track, or tire storage structure. In another example, the tire discharge station 44 can include a powered conveyor system, such as a powered roller track, conveyor belt, etc. In yet another example, the tire discharge station can be arranged relatively flat, or can be arranged at an angle such that the tire moves away from the post cure inflator 14 under the force of gravity. In one example, as shown in FIG. 11, at least a portion of the tire discharge station 44 can be movable among various orientations, such as between a relatively flat arrangement and an angled arrangement, by a powered mechanism 45 (see FIG. 3), such as by a pneumatic cylinder, hydraulic cylinder, electric motor, etc.

In addition or alternatively, both of the post cure inflator 14 and loading apparatus 12 are located on a support surface 55 (see FIG. 3), such as a supporting table or frame, a factory floor, etc., and receive operational power from at least one utilities service 56. Various utilities services include electric, pneumatic, hydraulic, gas, etc. In one example, the motive power for the entire post cure inflator 10 can be provided by pneumatic utilities service, although a low voltage electrical system (e.g., 24 volts or the like) can also be provided for use with the control system, sensors, audio/video indicators, etc. The at least one utilities service 56 can be provided to at least one fixed portion of the combination post cure inflator and loading apparatus 10 via said support surface 55. It is understood that the various utilities services can be provided directly or indirectly to each of the post cure inflator 14, loading apparatus 12, tire curing press 16, tire discharge station 44, etc. Thus, some or all of the utilities services can be conveniently located at a relatively fixed position at a lower level of the assembly with easy access and maintenance, reducing or eliminating lines/hoses to tangle or kink and no special clamping required for service lines. For example, the service lines (electric, gas, pneumatic, hydraulic, etc.) can extend to a fixed portion of the machine from the bottom, such as adjacent to or through the support surface 55, to provide for easier maintenance. Since the service lines can be attached to the fixed portion of the machine, they may be of relatively simpler construction and less prone to failure as compared to service lines that must move and flex during the operation of the machine. Moreover, the simplified utilities service can be relatively easier to maintain, especially in a tire-forming environment that utilizes numerous chemicals that can be corrosive, etc. It is understood that while various motive power options are discussed herein, it is to be appreciated that the mobile elements of the present invention can utilize any or all known motive power options, such as motors, engines, electric, pneumatic, hydraulic, gas, etc.

Figure 4:
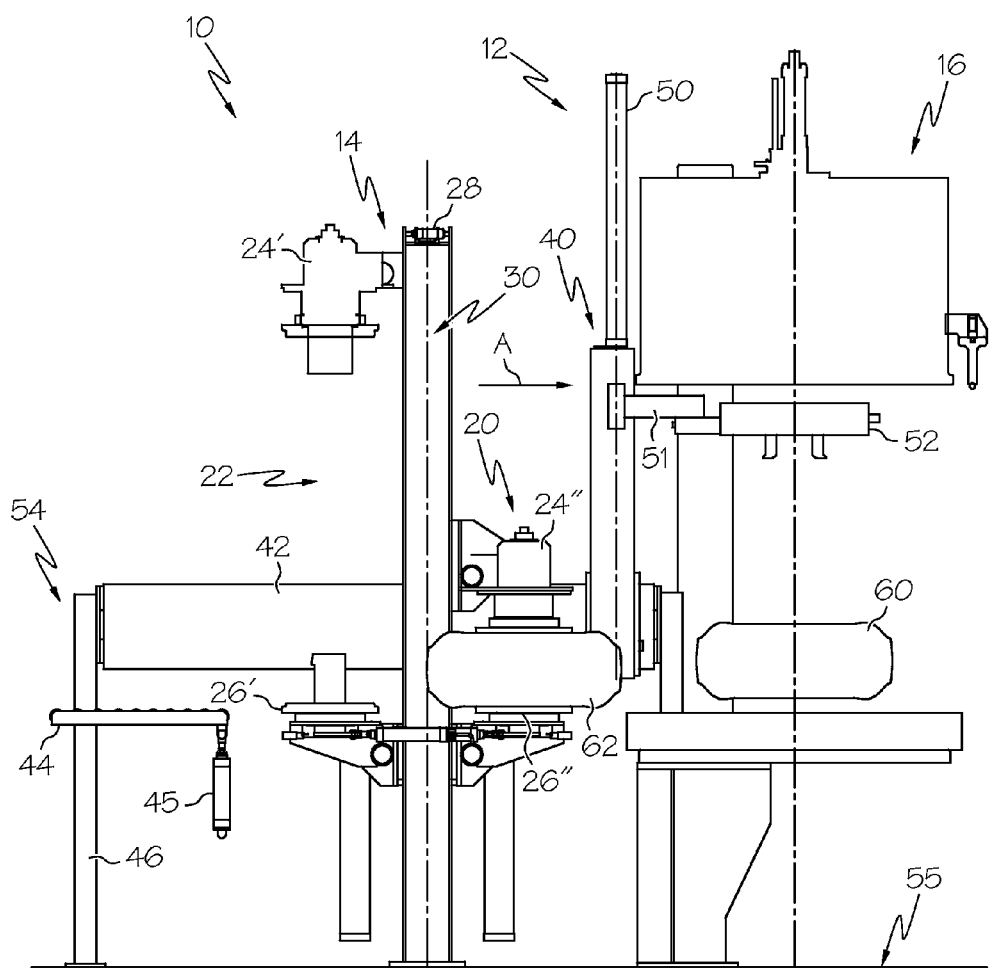

Turning now to FIGS. 3-12, an example operation cycle will now be described. It is to be understood that any of the example steps can be done in any order, that any of the steps can be modified, and that more or less steps can be used. Starting with FIG. 3, as the tire curing cycle ends, the loading arm 40 moves along the linear track 42 from a home position (e.g., about one end 54) and towards the cavity of the associated tire curing press 16 (FIG. 4, see arrow A). The loading arm 40 can also perform a pivoting, lateral swing motion relative to the linear track 42 to position the inside-grab mechanism 52 to be vertically above the vulcanized tire 60 in the tire curing press 16. Additionally, the upper chuck ring 24' of one inflator station 22 moves vertically upward away from the lower chuck ring 26' and is ready to receive a vulcanized tire 60. As shown, another vulcanized tire 62 is curing in the other inflator station 20.

Figure 5:
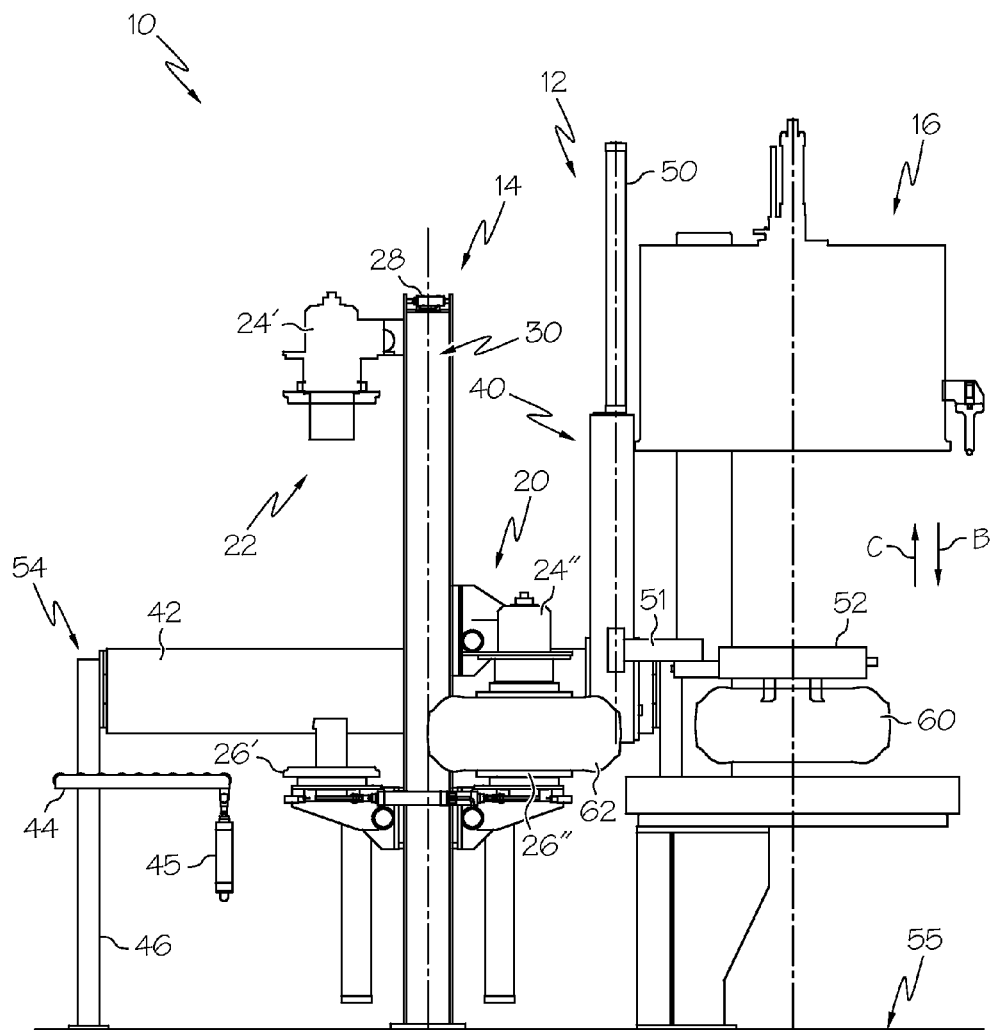

Turning to FIG. 5, the inside-grab mechanism 52 of the loading arm 40 moves vertically downward (see arrow B) toward the vulcanized tire 60. The inside-grab mechanism 52 engages an inner bead of the vulcanized tire 60, and then removes the cured tire 60 vertically upward and out of the press cavity (see arrow C). As described herein, the loading arm 40 is shown using an inside-grab mechanism adapted to grab a tire from the inside rim, though the loading arm 40 can also be used with an outside-grab mechanism adapted to grab a tire from its exterior perimeter.

Figure 6:
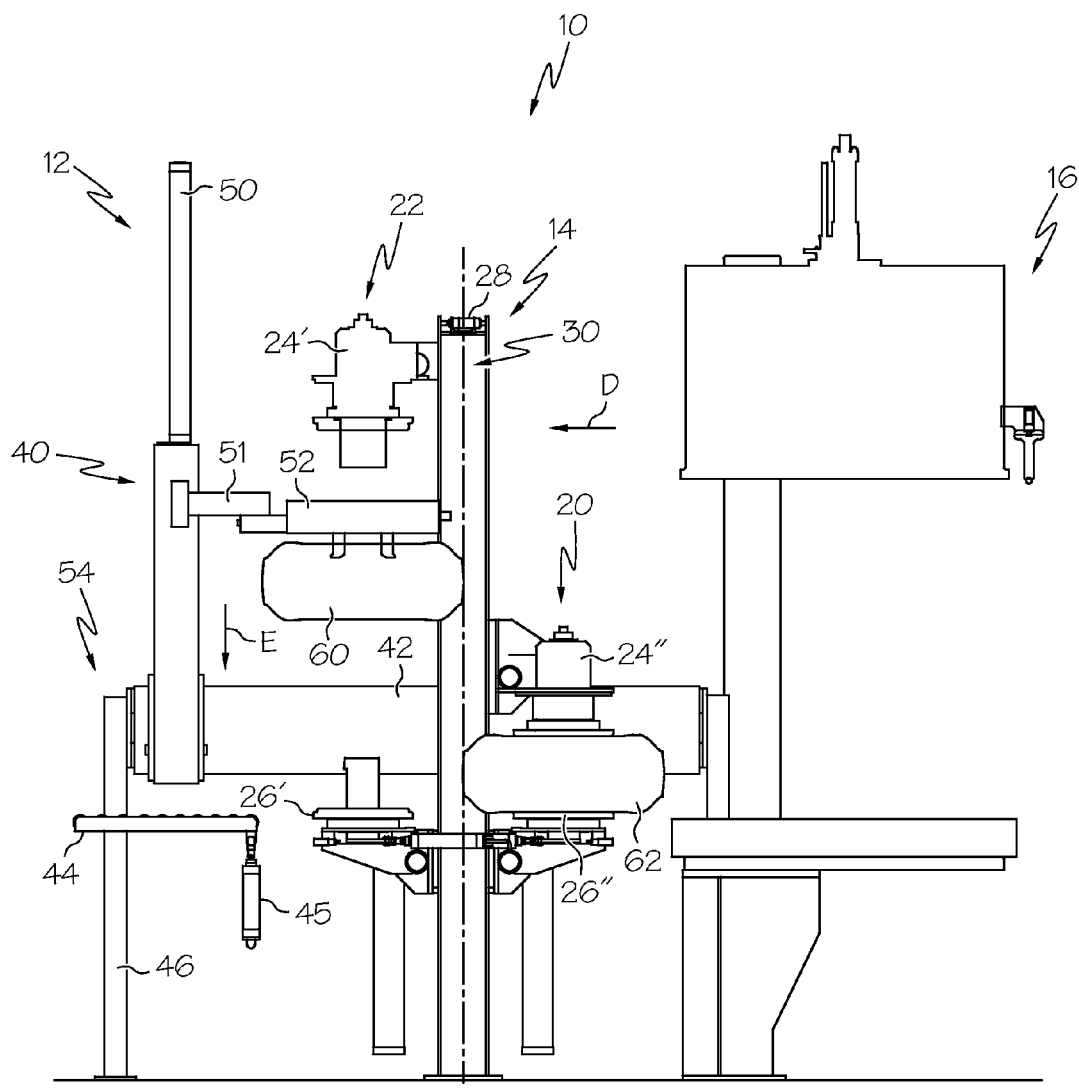

Turning to FIG. 6, the loading arm 40 moves the tire 60 toward the available inflator station 22 (see arrow D) and positions the tire 60 to be axially aligned with the upper and lower chuck rings 24', 26'. The loading arm 40 then moves the tire 60 vertically downward and onto the lower chuck ring 26' (see arrow E). Additionally, though not shown, another tire can be placed into the vacant cavity of the tire curing press 16.

Figure 7:
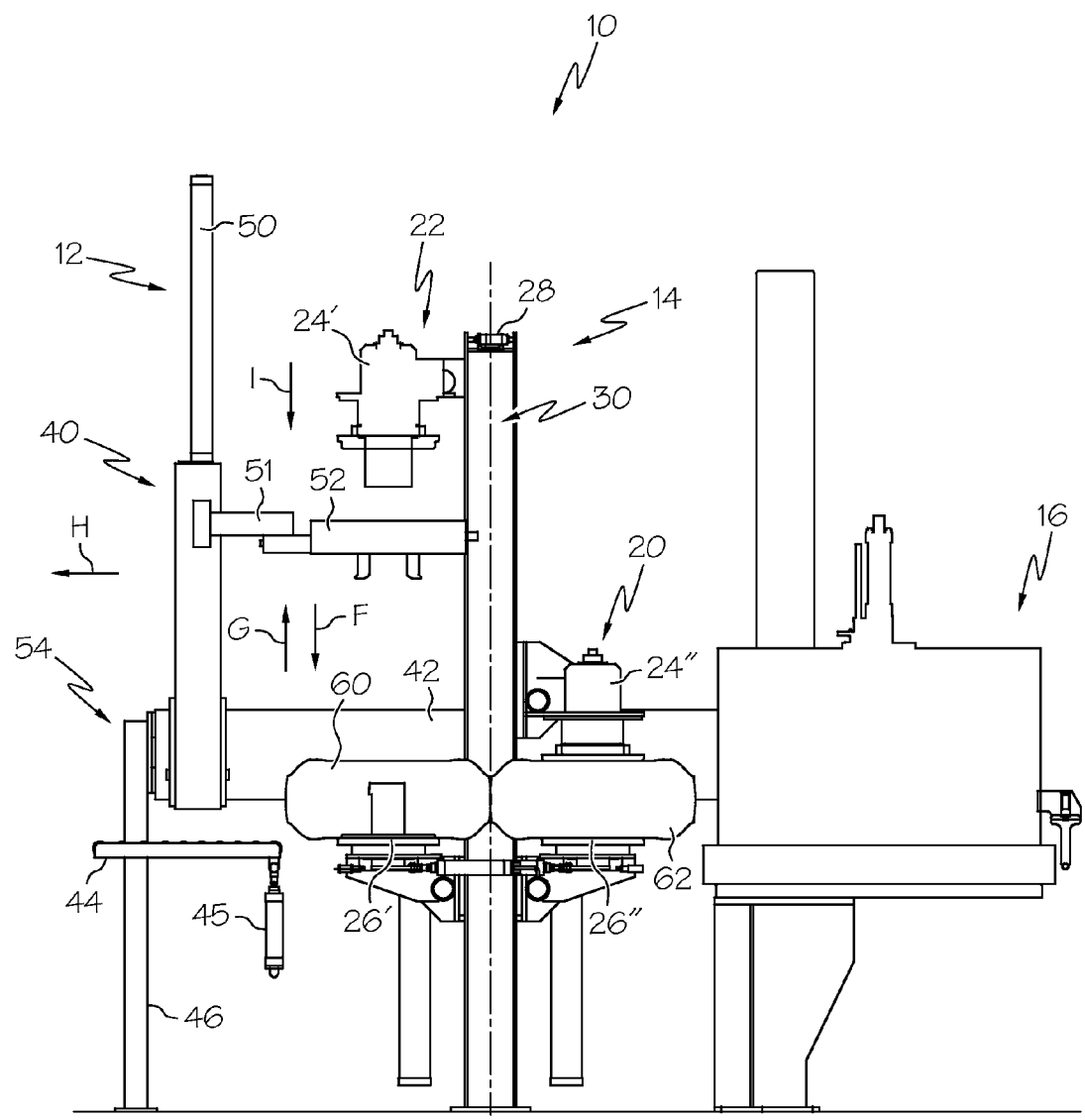
Figure 8:
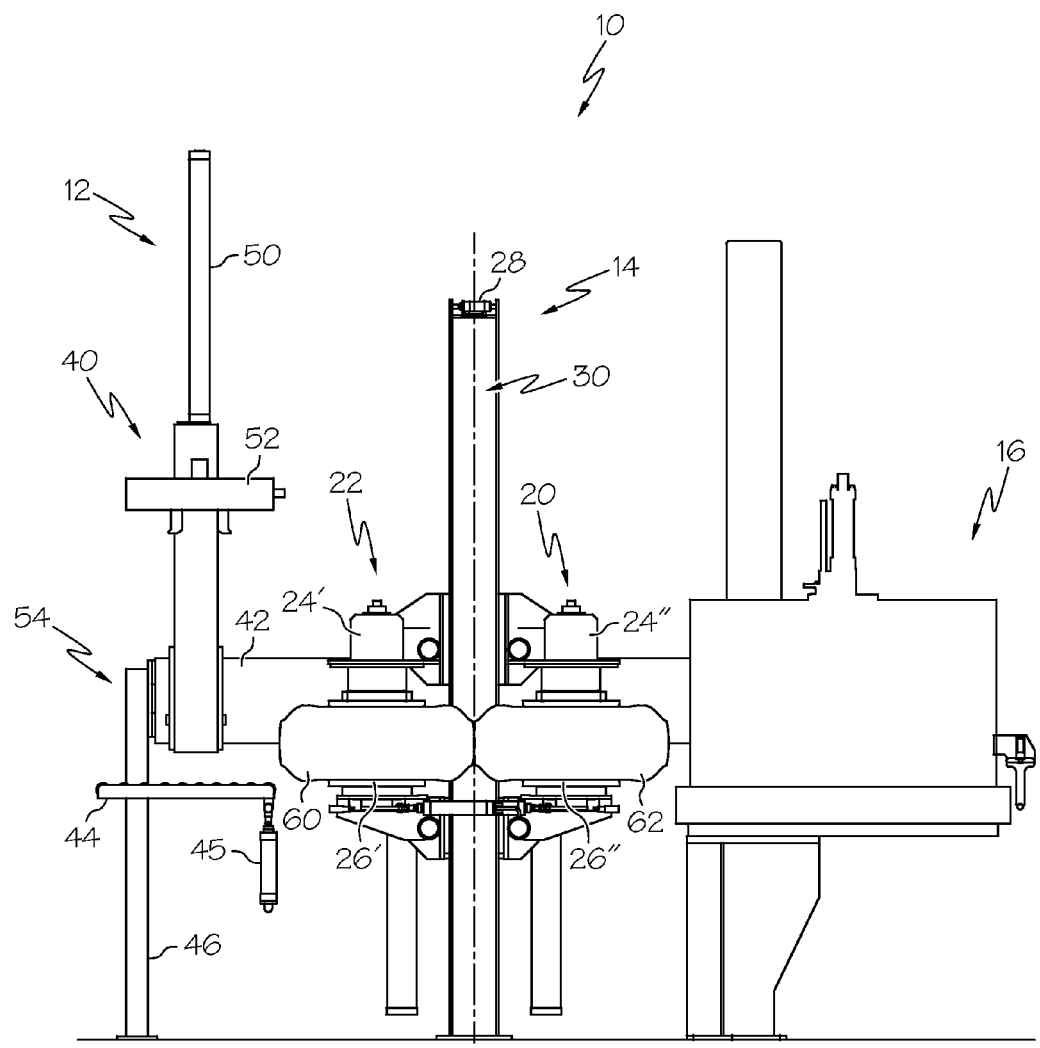

Turning to FIG. 7, after the vulcanized tire 60 is placed by the loading arm 40 on to the lower chuck ring 26' (see arrow F), the loading arm 40 then moves vertically upward and away (see arrows G-H) from the inflator station 22 to allow the upper chuck ring 24' to descend vertically downward (see arrow I) onto the lower chuck ring 26' to set rim width and lock the chuck rings 24', 26' together for inflation. Turning to FIG. 8, the inflator station 22 locks and post curing of the tire 60 begins. The loading arm 40 can be moved to various positions, such as back to the home position or towards the location of the next operation. Additionally, another tire (not shown) is placed into the tire curing press 16 by a loading device, which may include the loading arm 40 or another loading system (e.g., tire press loader 66 in FIG. 2).

Figure 9:
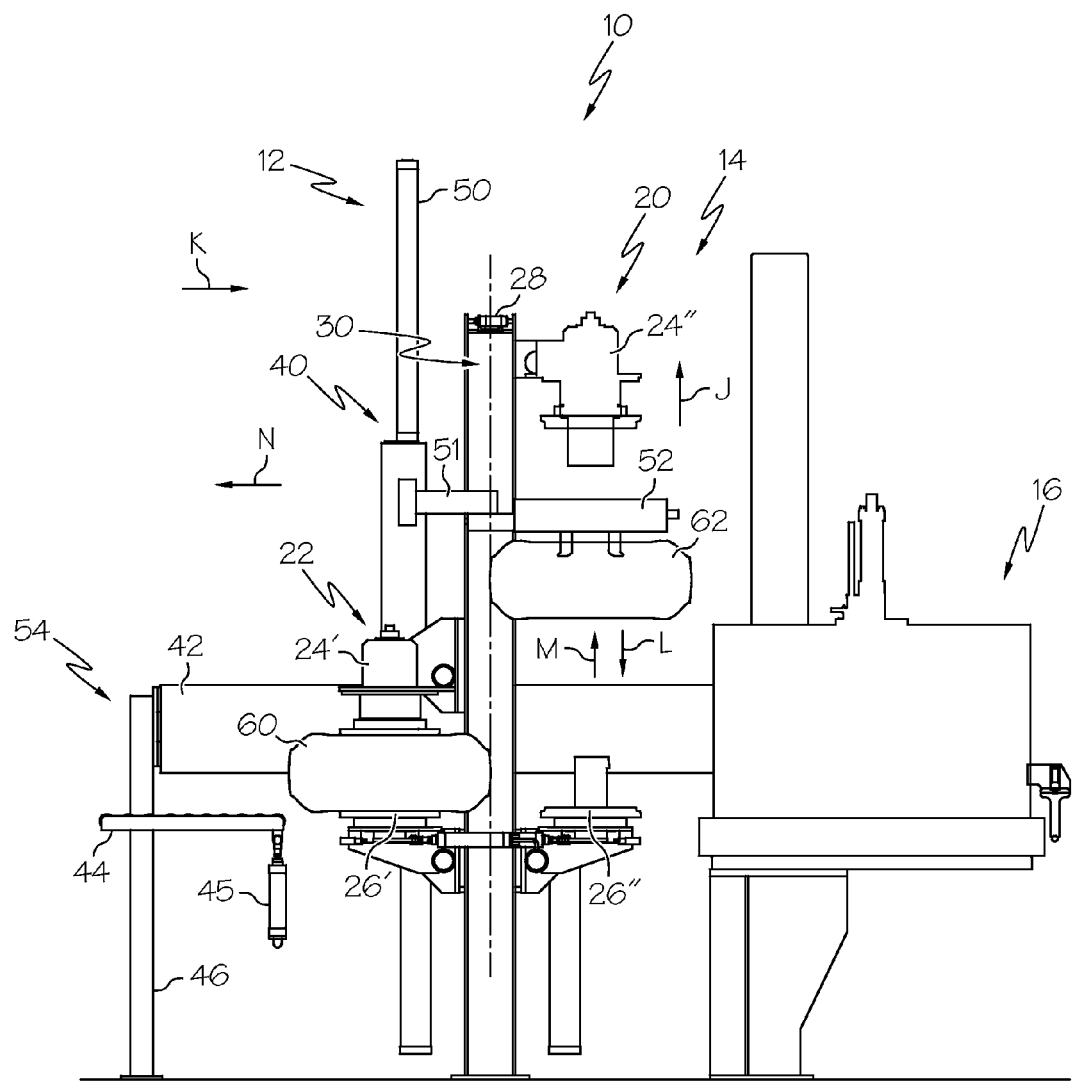
Figure 10:
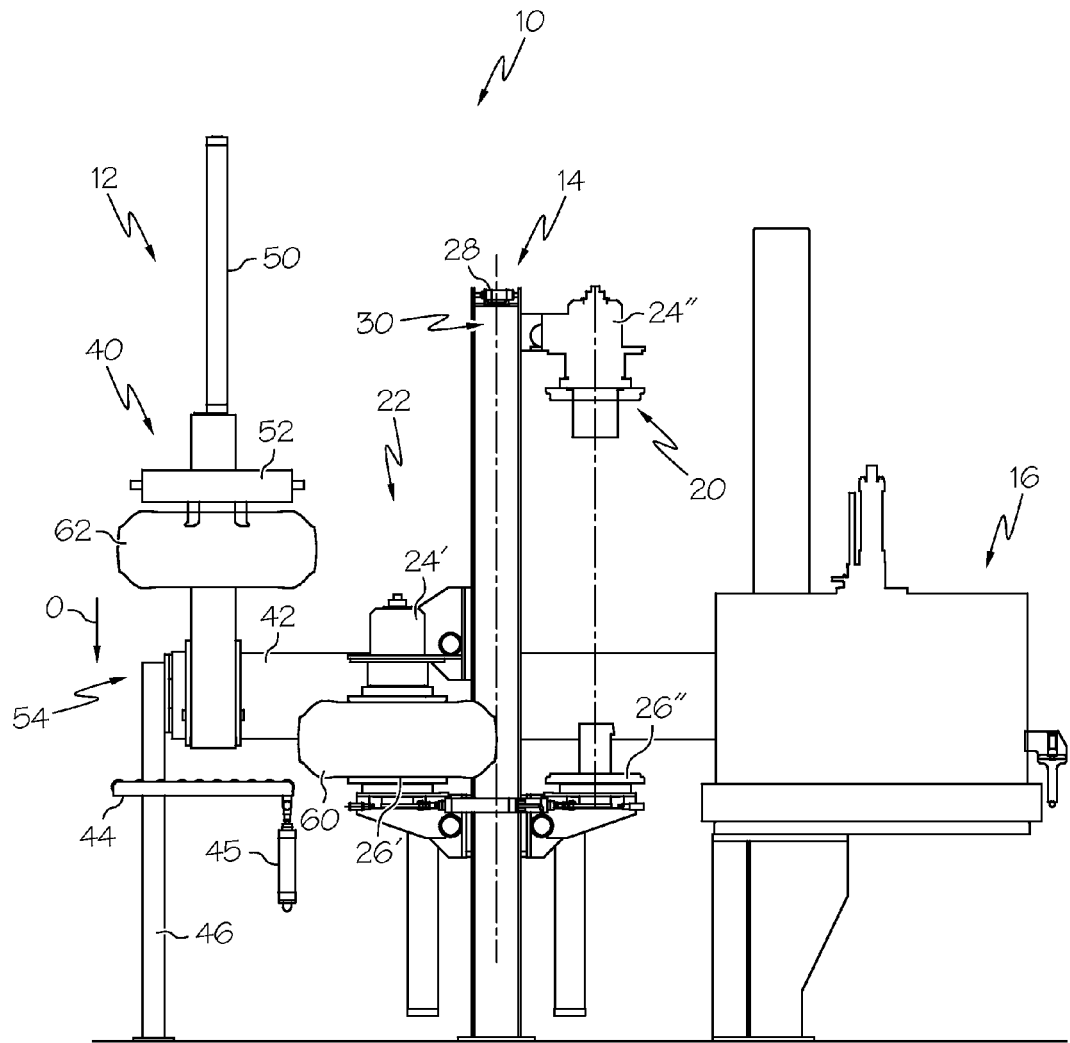

Turning to FIG. 9, after the tire post curing cycle on the other inflator station 20 is complete, the loading arm 40 is now free to remove the post cured tire 62 from the inflator station 20. Similar to before, the upper chuck ring 24" of inflator station 20 is moved vertically upward (see arrow J), the loading arm 40 moves into position over the tire 62 (see arrows K-L), and the loading arm 40 picks up the tire 62 via the inside-grab mechanism 52. The loading arm 40 lifts the tire 62 upward (see arrow M) off of the inflator station 20, and then moves the tire 62 out and away (see arrow N). Turning to FIG. 10, the loading arm 40 can then move the tire 62 into position to be deposited on the tire discharge station 44 (see arrow O). Optionally, the tire 62 can remain on the loading arm 40 if the discharge conveyor is occupied with another post cured tire (not shown) that is awaiting transfer takeaway. Further, the upper chuck ring 24" can remain in the vertically upward position to permit receipt of a future tire.

The tire discharge station 44 can be arranged relative flat, or as shown in FIG. 11, can be arranged at an angle such that the tire moves away from the inflator station 20 (see arrow P) under the force of gravity. For example, the powered mechanism 45 can lift at least a portion of the tire discharge station 44 such that the tire 62 rolls downward and away.

Figure 12:
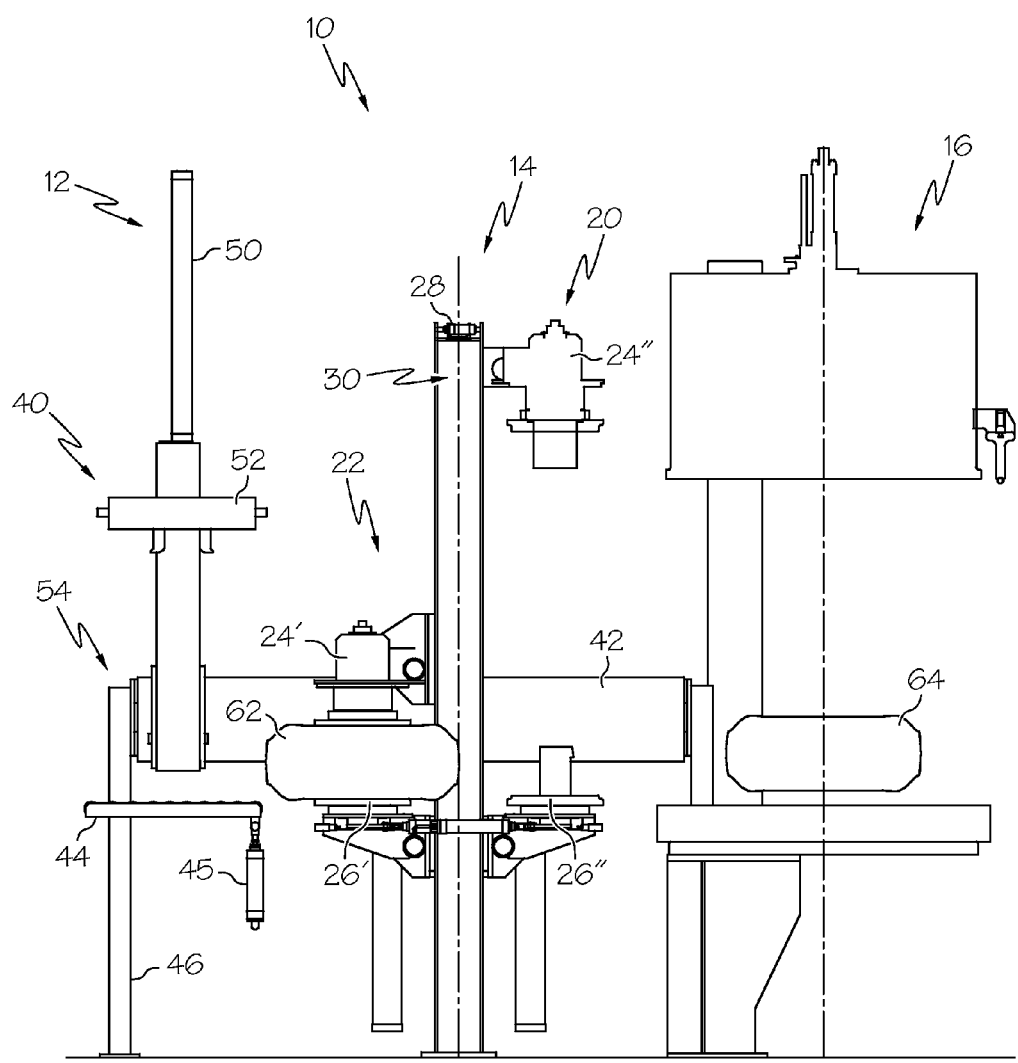

Turning finally to FIG. 12, the curing cycle of yet another tire 64 in the tire curing press 16 ends and the press cavity opens. As described herein, the loading arm 40 moves again from the home position to the press cavity and removes the cured tire 64 for placement onto the lower chuck ring 26" at the next available inflator station 20. Because the two stations 20, 22 are arranged in a staggered formation (see FIG. 1), the loading arm 40 is not blocked from accessing any desired inflator station 20, 22 by any of the tires retained therein. After the tire 64 is placed (not shown), the loading arm 40 leaves to allow upper chuck ring 24" to descend to the lower chuck ring 26" to set the rim width, and to lock the devices together for inflation, and another post curing cycle begins. The above-described cycle is performed in a repetitive manner as desired.

Various advantages of the present invention include, but are not limited to, the following aspects. In one example aspect, the loading apparatus 12 has the capability of loading the post cure inflator 14 and/or unloading a cured tire even if post curing is not required. In another example aspect, the loading arm 40 is a dual purpose device and no other device is required to load/unload tire from either the tire press or post cure inflator 14.

In another example aspect, electric motors, gear units or rotating mechanisms are not required as for the conventional turnover function, and the P.C.I. does not have to rotate. In yet another example aspect, P.C.I. chuck ring change is ergonomically achieved when upper and lower locking chuck rings are brought together in the down position. For example, few or zero ladders, platforms and/or lifting devices may be required by service personnel to change the upper and lower chuck rings when the device is used with different size tires.

In yet another example aspect, the multi-station layout occupies approximately the same floor space required as a traditional turnover layout. In still yet another example aspect, the innovative assembly features with very few moving parts and commonality between parts. In still yet another example aspect, commonality of parts provides simple changeover from dual cavity press to independent cavity press with little modifications.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A combination loader and post cure tire inflator for use with a tire press, comprising:
   a post cure inflator for inflating and curing vulcanized tires, comprising a plurality of inflator stations with each inflator station comprising a pair of axially aligned, vertically separable tire inflating chuck rings; and
   a loading apparatus comprising a loading arm movable along a linear track relative to the plurality of inflator stations to load and unload each vulcanized tire in a selected one of the plurality of inflator stations without rotating the vulcanized tires in a turnover operation.

2. The combination loader and post cure tire inflator of claim 1, wherein the motion of the loading arm along the linear track includes a horizontal component.

3. The combination loader and post cure tire inflator of claim 2, wherein the loading arm includes a motion component movable along an axis transverse to the linear track for loading and unloading said vulcanized tire in the selected one of the plurality of inflator stations.

4. The combination loader and post cure tire inflator of claim 3, wherein at least a portion of the loading arm includes a vertical motion component relative to the linear track.

5. The combination loader and post cure tire inflator of claim 1, wherein each pair of tire inflating chuck rings is coupled to a frame and comprises an upper chuck ring and a lower chuck ring, and wherein the lower chuck ring is maintained at a fixed location on the frame while the upper chuck ring is vertically movable along the frame.

6. The combination loader and post cure tire inflator of claim 1, wherein each pair of tire inflating chuck rings is coupled to a frame and comprises an upper chuck ring and a lower chuck ring, wherein the upper chuck ring is maintained at a fixed location on the frame while the lower chuck ring is vertically movable along the frame.

7. The combination loader and post cure tire inflator of claim 1, wherein the loading arm has a home position at a location along said linear track, and the loading arm returns to said home position when not performing a loading or unloading operation.

8. The combination loader and post cure tire inflator of claim 1, further comprising a tire discharge station located downstream of the plurality of inflator stations, wherein the loading arm is adapted to move said vulcanized tire from a selected one of the plurality of inflator stations to the tire discharge station.

9. The combination loader and post cure tire inflator of claim 1, wherein the plurality of inflator stations are arranged in a staggered formation such that at least two of the plurality of inflator stations can be used simultaneously.

10. The combination loader and post cure tire inflator of claim 1, wherein both of the post cure inflator and the loading apparatus are located on a support surface and receive operational power from at least one utilities service, and said at least one utilities service is provided to a fixed portion of the combination loader and post cure inflator via said support surface.

11. A combination loader and post cure tire inflator for use with a tire press, comprising:
    a post cure inflator for inflating and curing vulcanized tires, comprising a plurality of inflator stations with each inflator station comprising an upper chuck ring axially aligned with and vertically separable from a lower chuck ring,
    wherein each pair of upper and lower chuck rings is coupled to a frame with one of the upper and lower chuck rings is maintained at a fixed location on the frame while the other of the upper and lower chuck rings is vertically movable along the frame; and
    a loading apparatus comprising a loading arm movable along a linear track relative to the plurality of inflator stations to load each vulcanized tire in a selected one of the plurality of inflator stations, and to unload said vulcanized tire therefrom for placement on a tire discharge station located downstream of the plurality of inflator stations.

12. The combination loader and post cure tire inflator of claim 11, wherein the motion of the loading arm along the linear track includes a horizontal component.

13. The combination loader and post cure tire inflator of claim 12, wherein at least a portion of the loading arm includes a vertical motion component relative to the linear track for loading and unloading said vulcanized tire in the selected one of the plurality of inflator stations.

14. The combination loader and post cure tire inflator of claim 11, wherein the lower chuck ring is maintained at a fixed location on the frame while the upper chuck ring is vertically movable along the frame.

15. The combination loader and post cure tire inflator of claim 11, wherein the plurality of inflator stations are arranged in a staggered formation such that at least two of the plurality of inflator stations can be used simultaneously.

16. A combination loader and post cure tire inflator for use with a tire press, comprising:
  a post cure inflator for inflating and curing vulcanized tires, comprising a plurality of inflator stations with each inflator station comprising a pair of axially aligned, vertically separable tire inflating chuck rings;
  a loading apparatus comprising a loading arm movable relative to the plurality of inflator stations to load and unload each vulcanized tire in a selected one of the plurality of inflator stations;
  a tire discharge station located downstream of the post cure inflator; and
  a workflow pathway extending through the post cure inflator and towards the tire discharge station,
  wherein the loading apparatus is arranged to permit the loading arm to retrieve each vulcanized tire from a tire curing press located upstream of the post cure inflator and move said vulcanized tire along the workflow pathway.

17. The combination loader and post cure tire inflator of claim 16, wherein the loading apparatus comprises a linear track, and the loading arm is movable along the linear track.

18. The combination loader and post cure tire inflator of claim 17, wherein the linear track is arranged to permit the loading arm to move said vulcanized tire to any position along the workflow pathway.

19. The combination loader and post cure tire inflator of claim 17, wherein the loading arm includes a motion component movable along an axis transverse to the linear track for loading and unloading said vulcanized tire in the selected one of the plurality of inflator stations.

20. The combination loader and post cure tire inflator of claim 16, wherein each pair of tire inflating chuck rings is coupled to a frame and comprises an upper chuck ring and a lower chuck ring, and wherein the lower chuck ring is maintained at a fixed location on the frame while the upper chuck ring is vertically movable along the frame.

* * * * *